United States Patent
Novak et al.

(10) Patent No.: US 11,428,312 B2
(45) Date of Patent: Aug. 30, 2022

(54) HYDRAULIC SYSTEM FOR A MOTOR VEHICLE TRANSMISSION

(71) Applicant: ZF Friedrichshafen AG, Friedrichshafen (DE)

(72) Inventors: Rainer Novak, Bregenz (AT); Tobias Pfleger, Markdorf (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 304 days.

(21) Appl. No.: 16/759,098

(22) PCT Filed: Sep. 6, 2018

(86) PCT No.: PCT/EP2018/073953
§ 371 (c)(1),
(2) Date: Apr. 24, 2020

(87) PCT Pub. No.: WO2019/081110
PCT Pub. Date: May 2, 2019

(65) Prior Publication Data
US 2021/0180686 A1     Jun. 17, 2021

(30) Foreign Application Priority Data

Oct. 26, 2017 (DE) ..................... 10 2017 219 198.8
Oct. 26, 2017 (EP) ..................... 17198538

(51) Int. Cl.
*F16H 61/02* (2006.01)
*F16H 61/00* (2006.01)
*F16H 61/30* (2006.01)

(52) U.S. Cl.
CPC ..... *F16H 61/0206* (2013.01); *F16H 61/0031* (2013.01); *F16H 61/30* (2013.01);
(Continued)

(58) Field of Classification Search
CPC .. F16H 61/0206; F16H 61/0031; F16H 61/30; F16H 2061/0209
(Continued)

(56) References Cited

U.S. PATENT DOCUMENTS 9,366,337 B2   6/2016   Wi
10,704,679 B2 *   7/2020   Murakami .......... F16H 61/0276
(Continued)

FOREIGN PATENT DOCUMENTS

DE          10318152 A1   11/2004
DE    102009005753 A1   7/2010
(Continued)

OTHER PUBLICATIONS

International Search Report (English Translation) PCT/EP2018/073953, dated Nov. 5, 2018. (2 pages).

*Primary Examiner* — Ha Dinh Ho
(74) *Attorney, Agent, or Firm* — Dority & Manning, P.A.

(57) ABSTRACT

A hydraulic system (HY) for a motor vehicle transmission (G) includes at least one pump (P), two pump output lines (P1, P2) for supplying a first pressure circuit (1) and a second pressure circuit (2), and an electromagnetically actuated, first pressure control valve (EDS1), the inlet (EDS11) of which is connected to the first pressure circuit (1) and the outlet (EDS12) of which is connected to a first control surface (PVC) of a spring-loaded shut-off valve (PV). The shut-off valve (PV) is configured for connecting, in a non-actuated condition, the second pump output line (P2) to the second pressure circuit (2) and, in the condition actuated via the first control surface (PVC), disconnecting the second pump output line (P2) from the second pressure circuit (2). A motor vehicle transmission (G) including such a hydraulic system (HY) and a drive train including such a motor vehicle transmission (G) are also provided.

16 Claims, 4 Drawing Sheets

(52) U.S. Cl.
CPC ............... *F16H 2061/0037* (2013.01); *F16H 2061/0209* (2013.01)

(58) Field of Classification Search
USPC .......................................................... 74/335
See application file for complete search history.

(56) References Cited

U.S. PATENT DOCUMENTS

| | | | |
|---|---|---|---|
| 11,060,604 B2* | 7/2021 | Saito | ........................ F16H 57/04 |
| 2002/0033314 A1* | 3/2002 | Kato | .................... F16D 25/123 |
| | | | 192/70.12 |
| 2011/0314945 A1 | 12/2011 | Brandenburg et al. | |
| 2014/0083811 A1* | 3/2014 | Ito | ........................... F16D 25/14 |
| | | | 192/85.63 |
| 2017/0009877 A1 | 1/2017 | Ichimura et al. | |
| 2017/0059032 A1 | 3/2017 | Son et al. | |

FOREIGN PATENT DOCUMENTS

| | | |
|---|---|---|
| DE | 102013114288 A1 | 3/2015 |
| EP | 1420186 A2 | 5/2004 |

\* cited by examiner

HYDRAULIC SYSTEM FOR A MOTOR VEHICLE TRANSMISSION

CROSS-REFERENCE TO RELATED APPLICATION

The present application is related and has right of priority to German Patent Application No. 10 2017 219 198.8 filed on Oct. 26, 2017, to European Patent Application No. 17198538.5 filed on Oct. 26, 2017, and to PCT International Publication No. WO2019/081110, all of which are incorporated by reference in their entirety for all purposes.

FIELD OF THE INVENTION

The invention relates generally to a hydraulic system for a motor vehicle transmission. The invention further relates generally to a motor vehicle transmission including such a hydraulic system and to a drive train including such a motor vehicle transmission.

BACKGROUND

Patent application DE 103 18 152 A1 describes an oil supply unit for a hydraulic circuit of a vehicle transmission. A first pump and a second pump, which are driven by various shafts, are provided. The second pump is utilized for supplying oil to a high-pressure circuit. The first pump is utilized for supplying oil to a low-pressure circuit once a limiting pressure has been reached in the high-pressure circuit. For this purpose, a pressure control valve is provided, which is controlled by the high-pressure circuit via an open-loop system. The pressure control valve shuts off a supply line of the low-pressure circuit. Below the limiting pressure, the first pump supplies the high pressure circuit if the output pressure of the first pump is greater than the output pressure of the second pump. The low-pressure circuit is suppliable, if necessary, from the high-pressure circuit with the aid of a complex control system.

Patent application DE 10 2013 114 288 A1 describes a hydraulic pressure feed system of an automatic transmission. In this case, a single vane pump delivers oil into two output lines, which are separated from each other. The first output line is connected to an inlet of a high-pressure control valve, which controls, via a closed-loop system, the hydraulic pressure fed to a high pressure section. In the closed-loop control process, excess hydraulic pressure is guided via a return line to a low-pressure section. The second output line is connected to a switching valve, via which, in the non-actuated condition of the switching valve, the second output line is connected to the inlet of the high-pressure control valve. The switching valve is actuated via the return line, in order to disconnect the second output line, if necessary, from the first output line and connect the second output line to the low-pressure section.

SUMMARY OF THE INVENTION

Example aspects of the invention provide a hydraulic system for a motor vehicle transmission, which is distinguished by a good controllability via an open-loop system, and a cost-effective configuration.

In this case, a motor vehicle transmission refers, in particular, to a multi-stage or continuously variable transmission, with the aid of which a multitude of gear ratios between an input shaft and an output shaft of the transmission is implementable. Such transmissions are utilized primarily in motor vehicles in order to adapt the rotational speed characteristic and the torque output characteristic of a drive unit to the driving resistances of the vehicle in a suitable way.

In example embodiments, a hydraulic system is provided, which includes at least one pump, a first pump output line for supplying a first pressure circuit, a second pump output line for supplying a second pressure circuit, and a first pressure control valve. The first pressure control valve is electromagnetically actuated and includes an inlet, which is connected to the first pressure circuit. The first pressure control valve is configured for making a pressure available, at an outlet, which has been reduced from the inlet or is the same. The pressure reduction takes place depending on a current supply to a solenoid of the first pressure control valve.

The two pump output lines are suppliable with hydraulic fluid either by a dual circuit pump including pressure regions separated from each other or by two different pumps. In the example embodiment including a dual circuit pump, each pump output line is connected to one of the pressure regions of the pump. In an example embodiment including two different pumps, each of the pump output lines is supplied with hydraulic fluid by a separate pump.

According to example aspects of the invention, the hydraulic system includes a spring-loaded shut-off valve. The outlet of the first pressure control valve is connected to a first control surface of the shut-off valve. The shut-off valve is configured for connecting, in the non-actuated condition, the second pump output line to the second pressure circuit. A non-actuated condition is understood to be, in this case, a switching condition of the shut-off valve, in which no external energy is supplied for the open-loop control of the shut-off valve. The shut-off valve, in the non-actuated condition, assumes the switching condition that results due to the spring-loading of the shut-off valve. If the shut-off valve is actuated via the first control surface, the second pump output line is disconnected from the second pressure circuit, so that the shut-off valve assumes a shut-off position.

By actuating the electromagnetically actuated, first pressure control valve, the supply of the second pressure circuit by the second pump output line is interruptible as necessary. As a result, the flow of the second pump output line can be made available for other purposes, as necessary, for example, for charging a launch clutch of the motor vehicle transmission immediately after an internal combustion engine start.

Preferably, a valve is provided, which connects the second pump output line to the first pump output line if the pressure in the second pump output line reaches or exceeds the pressure in the first pump output line. The valve is preferably designed as a seat valve without spring preload. If the shut-off valve is in the shut-off position, the pressure in the second pump output line increases until the valve opens. If the valve is open, the first pressure circuit is supplied by the flows of both pump output lines.

Due to the allocation of the functions "shut off the second pressure circuit" and "connect the pump output lines" to two different valves, pressure variations in the first hydraulic circuit can be avoided, since the energy for performing the function "connect the pump output lines" is made available from the flow of the second pump output line. The ability of consumers of the first pressure circuit to be controlled via an open-loop or closed-loop system is therefore improved.

If the flow made available via the first pump output line does not suffice for supplying consumers of the first pressure circuit, the pressure at the first control surface of the shut-off valve can be increased, by actuating the first pressure control valve, until the spring preload of the shut-off valve has been overcome and the shut-off valve assumes the shut-off position. After the valve has opened, the flows of the two pump output lines are combined, so that a sufficient supply of the consumers of the first pressure circuit is ensured.

A changeover of the shut-off valve starting from the shut-off position into the non-actuated condition can result in a lowering of the pressure in the second pump output line, since the second pressure circuit is now supplied with hydraulic fluid again. Preferably, the valve is configured for independently disconnecting the second pump output line from the first pump output line when the pressure in the second pump output line is less than the pressure in the first pump output line. As a result, the supply of the first pressure circuit can be ensured.

According to one possible first example embodiment of the hydraulic system, the shut-off valve can include a second control surface and a third control surface, which are preferably of equal size. These are permanently connected and are positioned opposite each other. A "permanent connection" is understood to mean, in this context, that the same pressure always acts upon these two control surfaces. Due to the arrangement of the second control surface and the third control surface opposite each other, the actuation of the shut-off valve is possible regardless of the pressure present in the second pressure circuit, so that the shut-off position of the shut-off valve can be selected also in the case of a high flow intake or volume flow consumption of the first pressure circuit.

According to one possible second example embodiment of the hydraulic system, the shut-off valve includes, in addition to the first control surface, precisely one further control surface. The further control surface is connected, in the non-actuated condition of the shut-off valve, to the second pump output line, and, in the shut-off position of the shut-off valve, is disconnected from the second pump output line. Such an example embodiment of the shut-off valve reduces the manufacturing complexity of the shut-off valve.

Preferably, the hydraulic system includes a second pressure control valve with a control surface, which is connected to the outlet of the first pressure control valve. The second pressure control valve is utilized for adjusting the pressure in the first pressure circuit depending on the pressure applied at the control surface of the second pressure control valve. If the pressure present in the first pressure circuit reaches or exceeds a limiting value, the two pressure circuits are connected to each other via the second pressure control valve. This limiting value is increased by increasing the pressure at the control surface of the second pressure control valve.

Since the first control surface of the shut-off valve as well as the control surface of the second pressure control valve are connected to the outlet of the first pressure control valve, there is a fixed relationship between the shut-off of the supply of the second pressure circuit via the shut-off valve and the pressure present in the first pressure circuit, so that a complex coordination can be omitted.

Preferably, the hydraulic system includes a spring-loaded retention valve, which is configured for preventing a return flow of hydraulic fluid out of the first pressure circuit into the first pump output line. As a result, a draining of the first pressure circuit can be prevented when the pump associated with the first pump output line is not driven.

According to one preferred example embodiment, the hydraulic system includes a third pressure control valve, which, similarly to the first pressure control valve, is electromagnetically actuatable. The third pressure control valve is configured for making a pressure available, at an outlet, which has been reduced by the inlet or is the same. The pressure reduction takes place depending on a current supply to a solenoid of the third pressure control valve. The inlet of the third pressure control valve is connected to the first pressure circuit. The outlet of the third pressure control valve is connected to a control surface of a spring-loaded proportional valve. The proportional valve is utilized for switchably connecting a section of the second pressure circuit to the supply line of the second pressure circuit. If a sufficiently high pressure is made available at the control surface of the proportional valve via the third control valve, the aforementioned section of the second pressure circuit is supplied with hydraulic fluid. In the non-actuated condition, or with insufficiently high pressure at the control surface, the aforementioned section is disconnected from the second circuit.

The hydraulic system can include an electronic control unit, with the aid of which at least the first pressure control valve can be controlled via an open-loop system. The control unit can be connected to multiple sensors and/or other control units, and is configured for processing received signals and releasing control commands, depending on characteristic maps or models, to the first pressure control valve and, if applicable, to further actuating elements of the hydraulic system.

The hydraulic system can be an integral part of a motor vehicle transmission. Preferably, the first pressure circuit is provided for the hydraulic actuation of at least one clutch and/or at least one gear change cylinder of the motor vehicle transmission. These types of hydraulic consumers usually need a defined hydraulic fluid volume and a defined hydraulic pressure. The second pressure circuit is preferably provided for cooling the at least one clutch. Such a hydraulic cooling usually needs a defined flow when the pressure demand is lower as compared to the first pressure circuit. Due to this assignment of the hydraulic consumers to the two pressure circuits, the hydraulic system has a low energy demand.

The section of the second pressure circuit, which is connectable or disconnectable via the proportional valve, is preferably assigned to a cooling of the at least one clutch. The connection of this clutch-cooling section to the supply of the second pressure circuit takes place preferably only during the continuous slip operation of the at least one clutch. A cooling in the disengaged or engaged condition of the clutch would increase the drag losses of the motor vehicle transmission.

Preferably, the hydraulic system includes a spring-loaded parking lock valve. With the aid of the parking lock valve, a hydraulically operating parking lock actuator can actuate a parking lock of the motor vehicle transmission. The supply connection of the parking lock valve is preferably permanently connected to the first pressure circuit. A control surface of the parking lock valve is preferably connected to the outlet of a pressure control valve, preferably to the outlet of the third pressure control valve.

The motor vehicle transmission can be an integral part of a motor vehicle drive train. For example, the motor vehicle transmission can be utilized in a hybrid drive train. An electric machine for driving such a hybrid drive train can be an integral part of the motor vehicle transmission. The second pressure circuit of the hydraulic system of such a motor vehicle transmission can supply a cooling of the electric machine.

BRIEF DESCRIPTION OF THE DRAWINGS

Exemplary embodiments of the invention are described in detail in the following with reference to the attached figures. Wherein.

DETAILED DESCRIPTION

Figure 1:
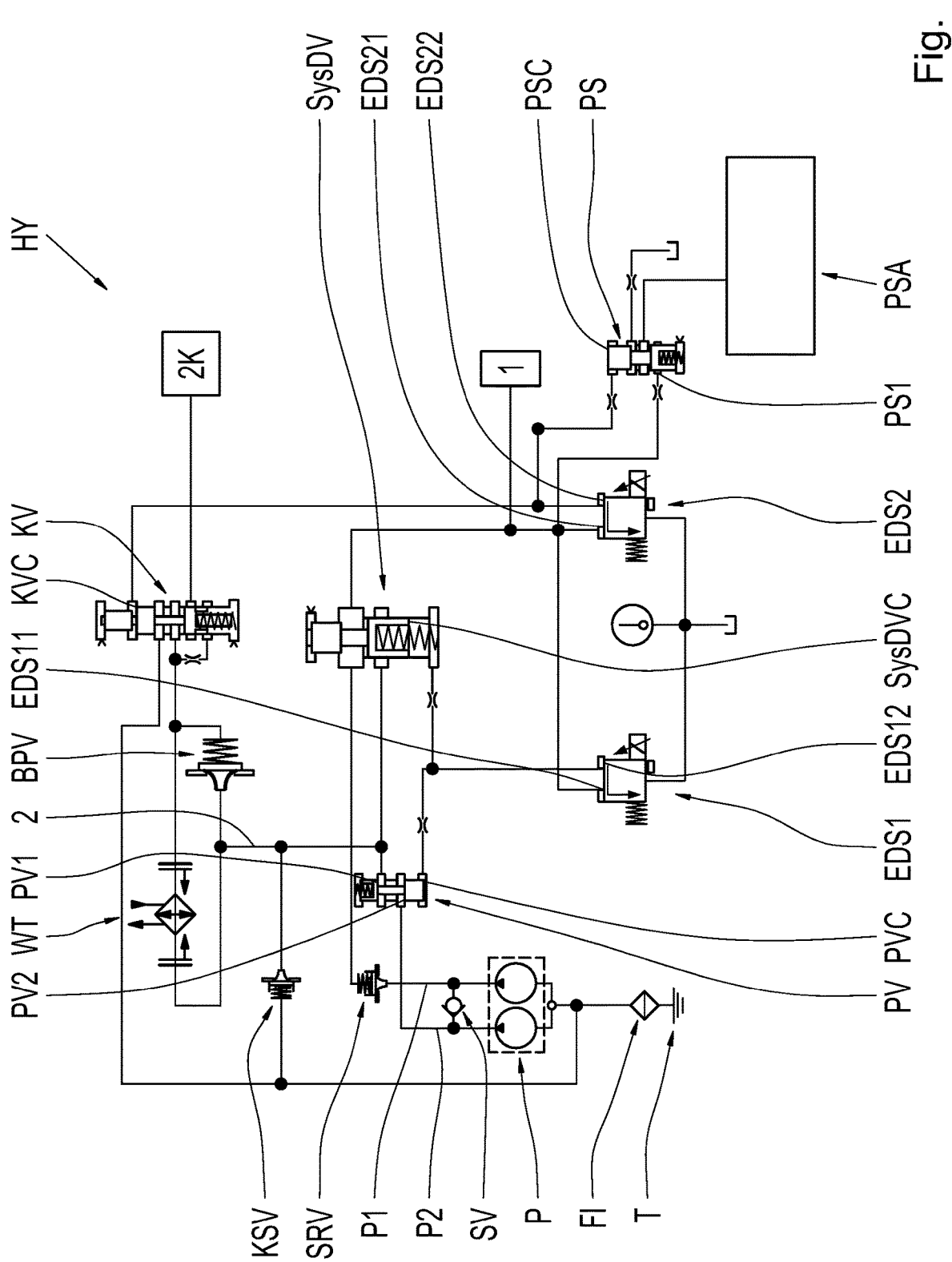
FIGS. 1 and 2 show a hydraulic system according to a first exemplary embodiment and a second exemplary embodiment of the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a hydraulic system HY according to a first exemplary embodiment of the invention. The hydraulic system HY includes a dual circuit pump P with two pressure regions separated from each other. One of the pressure regions is connected to a first pump output line P1. The other of the pressure regions is connected to a second pump output line P2. The dual circuit pump P aspirates or draws hydraulic fluid across a filter FI out of a tank T and delivers the hydraulic fluid into the two pump output lines P1, P2. The flow rate of the two pressure regions of the dual circuit pump P can differ from each other, wherein the flow rate associated with the second pump output line P2 is preferably greater than the flow rate associated with the first pump output line P1.

The first pump output line P1 is connected via a spring-loaded retention valve SRV to a first pressure circuit 1 of the hydraulic system HY. In other words, one of the two pressure regions of the dual circuit pump P delivers hydraulic fluid into the first pressure circuit 1 via the first pump output line P1 and via the retention valve SRV. The retention valve SRV prevents a return flow from the first pressure circuit 1 into the first pump output line P1.

The second pump output line P2 is connected to a pressure pocket of a spring-loaded shut-off valve PV. Due to the spring preload of the shut-off valve PV, the second pump output line P2 is connected via the shut-off valve PV to a second pressure circuit 2 of the hydraulic system HY. The shut-off valve PV includes a control surface PVC. A pressure acting upon the control surface PVC brings about a displacement of a piston of the shut-off valve PV against the spring preload of the shut-off valve PV. If the pressure on the control surface PVC is great enough, the connection between the second pump output line P2 and the second pressure circuit 2 is interrupted.

The pressure acting upon the control surface PVC is adjusted with the aid of a first pressure control valve EDS1. An inlet EDS11 of the first pressure control valve EDS1 is connected to the first pressure circuit 1. An outlet EDS12 of the first pressure control valve EDS1 is connected to the control surface PVC. The first pressure control valve EDS1 is electromagnetically controlled via an open-loop system. The pressure acting at the outlet EDS12 is adjustable depending on the current supply to a solenoid of the first pressure control valve EDS1. During the adjustment, excess hydraulic fluid is discharged to the tank T.

The shut-off valve PV includes a second control surface PV1 and a third control surface PV2, which are permanently connected, are positioned opposite each other, and are of equal size. In the non-actuated condition of the shut-off valve PV, the second control surface PV1 as well as the third control surface PV2 are connected to the second pressure output line P2 via the pressure pocket of the shut-off valve PV. Due to the arrangement of the two control surfaces PV1, PV2 opposite each other, the actuation force needed to reach the shut-off position of the shut-off valve PV is independent of the pressure present in the second pressure circuit 2.

Moreover, the outlet EDS12 of the first pressure control valve EDS1 is connected to a control surface SysDVC of a second pressure control valve SysDV. The second pressure control valve SysDV is spring-loaded and is arranged between the retention valve SRV and the first pressure circuit 1. The pressure acting in the first pressure circuit 1 counteracts the spring preload of the second pressure control valve SysDV. If the pressure in the first pressure circuit 1 is high enough, the first pressure circuit 1 is connected to the second pressure circuit 2. Therefore, the pressure acting in the first pressure circuit 1 is adjustable with the aid of the second pressure control valve SysDV. A pressure acting upon the control surface SysDVC acts upon a piston of the second pressure control valve SysDV in the same direction as the spring preload of the second pressure control valve SysDV. An increase of the pressure acting upon the control surface SysDVC therefore increases the pressure level of the first pressure circuit 1. Above a defined pressure level, the second pressure control valve SysDV connects the first pressure circuit 1 to the second pressure circuit 2.

If the connection between the second pump output line P2 and the second pressure circuit 2 is interrupted with the aid of the shut-off valve PV, the pressure in the second pump output line P2 increases. If the pressure present in the second pump output line P2 reaches or exceeds the pressure present in the first pump output line P1, a valve SV opens a connection between the two pump output lines P1, P2. The valve SV closes and opens in a pressure-dependent manner, so that the valve SV closes the connection between the two pump output lines P1, P2 again as soon as the pressure present in the first pump output line P1 is less than the pressure present in the second pump output line P2.

Moreover, the hydraulic system HY includes a third pressure control valve EDS2. An inlet EDS21 of the third pressure control valve EDS2 is connected to the first pressure circuit 1. An outlet EDS22 of the third pressure control valve EDS2 is connected to a control surface KVC of a spring-loaded proportional valve KV. The third pressure control valve EDS2 is electromagnetically controlled via an open-loop system. The pressure acting at the outlet EDS22 is adjustable depending on the current supply to a solenoid of the third pressure control valve EDS2. During the adjustment, excess hydraulic fluid is discharged to the tank T.

The pressure acting at the control surface KVC of the proportional valve KV counteracts the spring preload of the proportional valve KV. If the pressure acting at the control surface KVC exceeds a limiting value, a section 2K of the second pressure circuit 2 is connected to the supply of the second pressure circuit 2. Below this limiting value, the proportional valve KV shuts off the section 2K from the supply of the second pressure circuit 2. In this condition, the proportional valve KV connects the second pressure circuit 2 to a suction side of the dual circuit pump P, in order to make a suction charging available to the dual circuit pump P.

A heat exchanger WT is arranged upstream from the section 2K. Thermal energy is withdrawn from hydraulic fluid flowing into the second pressure circuit 2 via the heat exchanger WT. If the pressure drop at the heat exchanger WT exceeds a limiting value, a spring-loaded bypass valve BPV opens a connection between an inlet and an outlet of the heat exchanger WT. A spring-loaded protection valve KSV is arranged between the inlet of the heat exchanger WT and the suction charging line. The protection valve KSV opens if a pressure difference between the inlet of the heat exchanger WT and the suction charging line exceeds a limiting value.

Moreover, the outlet EDS22 of the third pressure control valve EDS2 is connected to a control surface PSC of a spring-loaded parking lock valve PS. The parking lock valve PS is utilized for the open-loop control of an actuator PSA. A supply connection PS1 of the parking lock valve PS is connected to the first pressure circuit 1. The pressure acting at the control surface PSC counteracts the spring preload of the parking lock valve PS. If the pressure acting at the control surface PSC exceeds a limiting value, the first pressure circuit 1 is connected to the actuator PSA via the parking lock valve PS. Below this limiting value, the actuator PSA is bled into the tank T.

Figure 2:
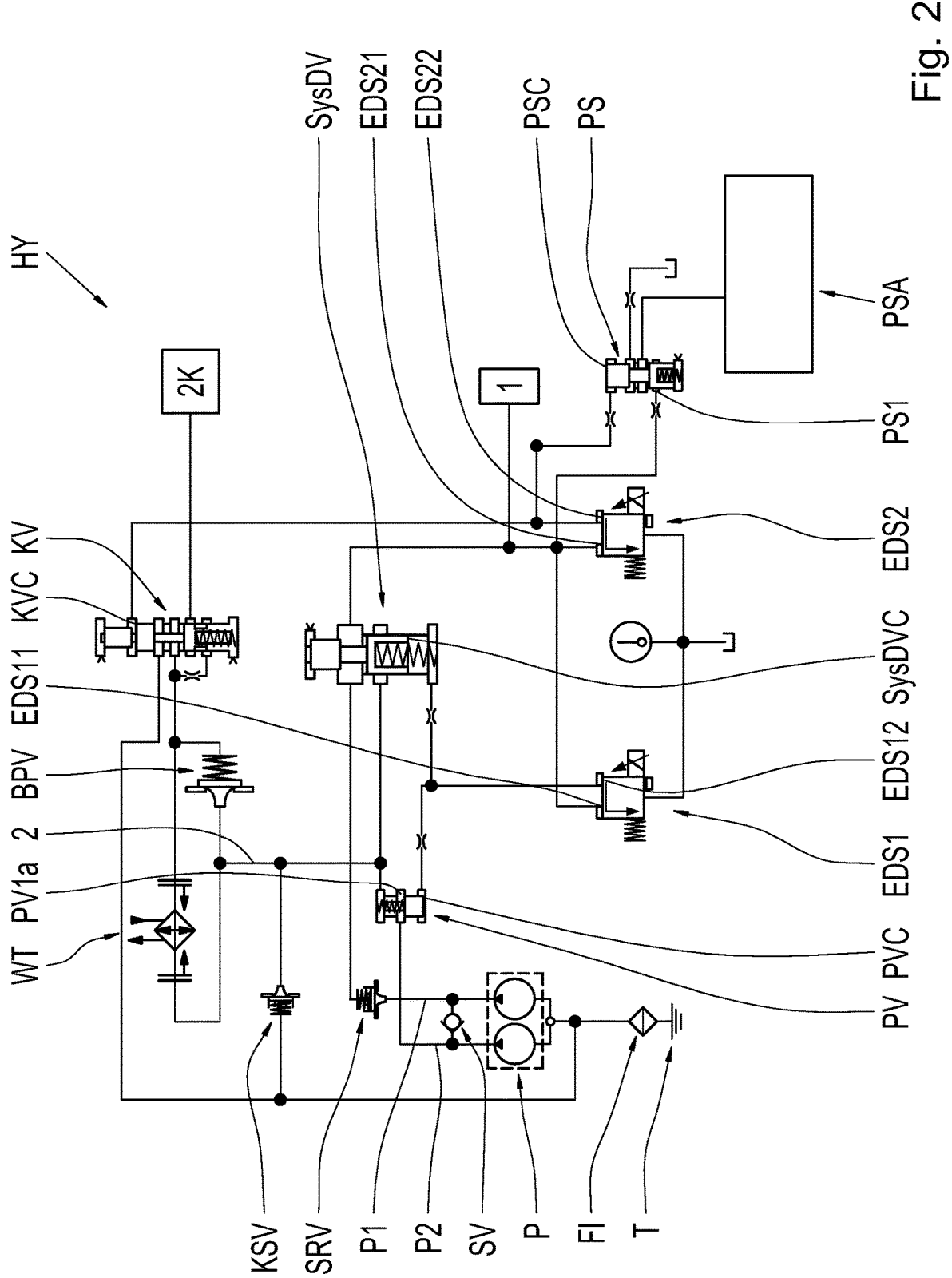

FIG. 2 shows a hydraulic system HY according to a second exemplary embodiment of the invention, which essentially corresponds to the first exemplary embodiment represented in FIG. 1. Only the shut-off valve PV is designed differently and includes, in this case, in addition to the first control surface PVC, precisely one further control surface PV1a. The pressure applied at the further control surface PV1a, together with the spring preload of the shut-off valve PV, counteracts the pressure applied at the first control surface PVC.

Figure 3:
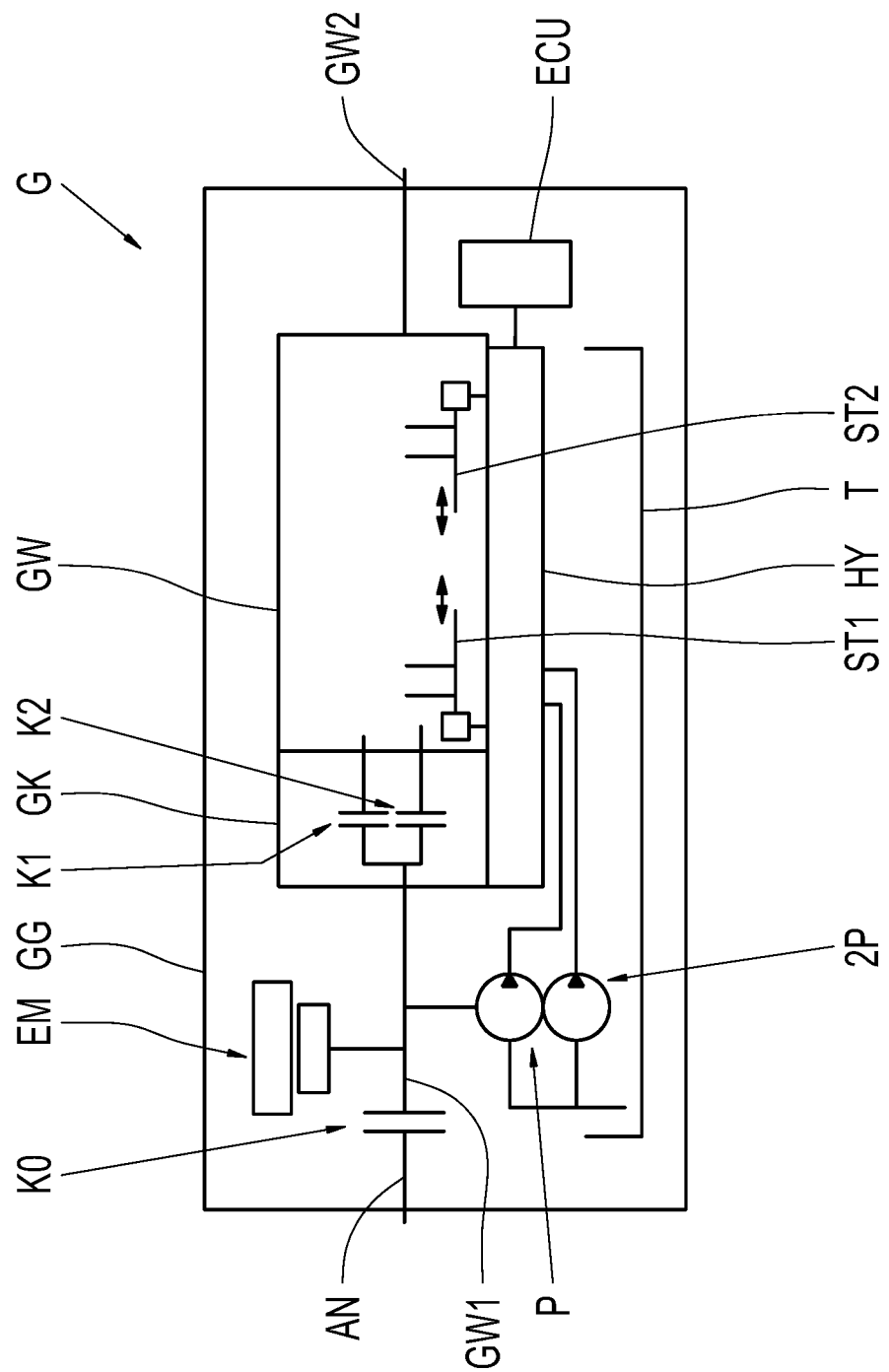
FIG. 3 shows a schematic of a motor vehicle transmission including the hydraulic system.

FIG. 3 shows a schematic of a motor vehicle transmission G including the hydraulic system HY. The motor vehicle transmission G includes a connecting shaft AN, which is connectable to an input shaft GW1 via a separating clutch K0. A rotor of an electric machine EM is connected to the input shaft GW1. The input shaft drives a pump P and a second pump 2P. The two pumps P, 2P are utilized for supplying pressure to the hydraulic system HY. Instead of the two pumps P, 2P, a dual circuit pump can be utilized, as described with respect to the exemplary embodiments in FIG. 1 and FIG. 2. In the same way, the dual circuit pump in FIG. 1 and FIG. 2 can be replaced by the two pumps P, 2P according to FIG. 3.

The motor vehicle transmission G includes a clutch section GK, which accommodates a first clutch K1 and a second clutch K2. By engaging the first clutch K1, the input shaft GW1 can be connected to a first sub-transmission. By engaging the second clutch K2, the input shaft GW1 can be connected to a second sub-transmission. In a gearshift section GW, different gear steps are implementable between the sub-transmissions and an output shaft GW2 with the aid of a gear set (not represented). The gear steps are engaged and disengaged, by way of example, with the aid of two gear change cylinders ST1, ST2, respectively. The gear change cylinders ST1, ST2 are actuated with the aid of the first pressure circuit 1 of the hydraulic system HY. The section 2K of the second pressure circuit 2 is provided for cooling the two clutches K1, K2.

The separating clutch K0 as well is actuatable via the first pressure circuit 1 of the hydraulic system HY, and are coolable with hydraulic fluid via the section 2K. In addition, the electric machine EM is coolable with hydraulic fluid via the section 2K.

An electronic control unit ECU controls the electromagnetically actuated pressure control valves EDS1, EDS2 of the hydraulic system HY by way of an open-loop system. The control unit ECU is connected to multiple sensors and other control units, and is configured for processing received signals and releasing control commands, depending on characteristic maps or models, to the pressure control valves EDS1, EDS2 and, if applicable, to further actuating elements of the hydraulic system HY.

Figure 4:
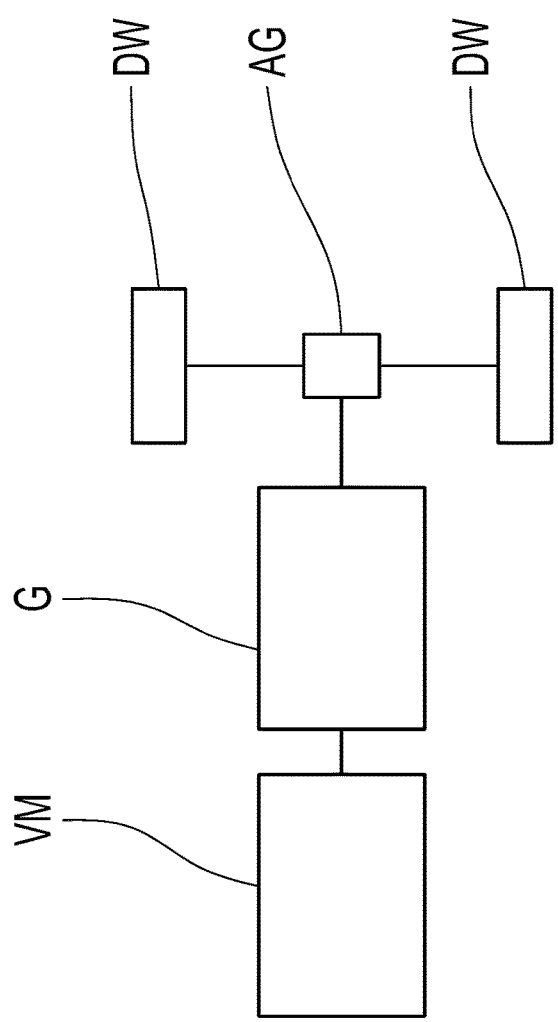
FIG. 4 and FIG. 5 each show a drive train of a motor vehicle including the motor vehicle transmission.

FIG. 4 shows a motor vehicle drive train including the motor vehicle transmission G. The connection shaft AN of the motor vehicle transmission G is connected to an internal combustion engine VM. The output shaft GW2 of the motor vehicle transmission G is connected to a differential gear AG. The differential gear AG is configured for distributing the power applied at the output shaft GW2 to driving wheels DW of the drive train. The drive train is oriented longitudinally with respect to a direction of travel of the motor vehicle.

Figure 5:
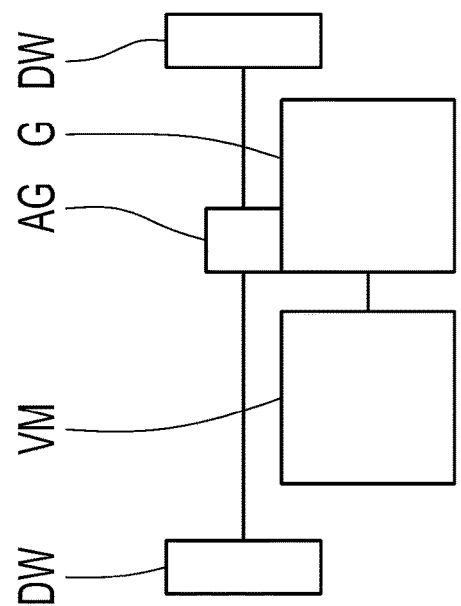

FIG. 5 also shows a motor vehicle drive train including the motor vehicle transmission G, which essentially corresponds to the drive train represented in FIG. 4. The drive train is oriented transversely with respect to a direction of travel of the motor vehicle in this case.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE SIGNS

HY hydraulic system
G motor vehicle transmission
P pump
2P second pump
P1 first pump output line
P2 second pump output line
1 first pressure circuit
2 second pressure circuit
2K section
EDS1 first pressure control valve
EDS11 inlet
EDS12 outlet
SysDV second pressure control valve
SysDVC control surface
EDS2 third pressure control valve
EDS21 inlet
EDS22 outlet
PV shut-off valve
PVC first control surface
PV1 second control surface
PV2 third control surface
PV1a further control surface
SV valve SRV retention valve
PS parking lock valve
PS1 supply connection
PSC control surface
PSA actuator
WT heat exchanger
KSV protection valve
BPV bypass valve
KV proportional valve
KVC control surface
FI filter
T tank
AN connection shaft
K0 separating clutch
GW1 input shaft
GW2 output shaft
K1 clutch
K2 clutch
GK clutch section
GW gearshift section
ST1 gear change cylinder
ST2 gear change cylinder
GG housing
ECU control unit
VM internal combustion engine
AG differential gear
DW driving wheel

The invention claimed is:

1. A hydraulic system (HY) for a motor vehicle transmission (G), comprising:
   at least one pump (P);
   a first pump output line (P1) for supplying a first pressure circuit (1);
   a second pump output line (P2) for supplying a second pressure circuit (2);
   a spring-loaded shut-off valve (PV); and
   an electromagnetically actuated first pressure control valve (EDS1), an inlet (EDS11) of the first pressure control valve (EDS1) connected to the first pressure circuit (1),
   wherein an outlet (EDS12) of the first pressure control valve (EDS1) is connected to a first control surface (PVC) of the shut-off valve (PV), and
   wherein the shut-off valve (PV) is configured for connecting the second pump output line (P2) to the second pressure circuit (2) in a non-actuated condition of the shut-off valve (PV), and the shut-off valve (PV) is configured for disconnecting the second pump output line (P2) from the second pressure circuit (2) in a condition of the shut-off valve (PV) actuated via the first control surface (PVC).

2. The hydraulic system (HY) of claim 1, further comprising a valve (SV) configured for connecting the second pump output line (P2) to the first pump output line (P1) when a pressure in the second pump output line (P2) reaches or exceeds a pressure in the first pump output line (P1).

3. The hydraulic system (HY) of claim 2, wherein the valve (SV) is configured for independently disconnecting the first and second pump output lines (P1, P2) when the pressure in the first pump output line (P1) is greater than the pressure in the second pump output line (P2).

4. The hydraulic system (HY) a of claim 1, wherein the shut-off valve (PV) further comprises a second control surface (PV1) and a third control surface (PV2), the second and third control surfaces (PV1, PV2) are permanently connected and positioned opposite each other, the second and third control surfaces (PV1, PV2) connected to the second pump output line (P2) in the non-actuated condition of the shut-off valve (PV), the second control surface (PV2) disconnected from the second pump output line (P2) in the condition of the shut-off valve (PV) actuated via the first control surface (PVC).

5. The hydraulic system (HY) of claim 1, wherein the shut-off valve (PV) further comprises precisely one further control surface (PV1a), the further control surface (PV1a) connected to the second pump output line (P2) in the non-actuated condition of the shut-off valve (PV), the further control surface (PV2a) disconnected from the second pump output line (P2) in the condition of the shut-off valve (PV) actuated via the first control surface (PVC).

6. The hydraulic system (HY) of claim 1, wherein the outlet (EDS12) of the first pressure control valve (EDS1) is further connected to a control surface (SysDVC) of a second pressure control valve (SysDV), and the second pressure control valve (SysDV) is configured for adjusting a pressure present in the first pressure circuit (1) in response to a pressure applied at the control surface (SysDVC) of the second pressure control valve (SysDV).

7. The hydraulic system (HY) of claim 1, wherein the pump (P) is a dual circuit pump comprising a first pressure region and a second pressure region, the first pressure region connected to the first pump output line (P1), the second pressure region connected to the second pump output line (P2).

8. The hydraulic system (HY) of claim 1, wherein the at least one pump (P) comprises a first pump and a second pump, the first pump operable to supply the first pump output line (P1), the second pump operable to supply the second pump output line (P2).

9. The hydraulic system (HY) of claim 1, further comprising a spring-loaded retention valve (SRV), the retention valve (SRV) configured for preventing a return flow of hydraulic fluid out of the first pressure circuit (1) into the first pump output line (1).

10. The hydraulic system (HY) of claim 1, wherein further comprising an electromagnetically actuatable third pressure control valve (EDS2), an inlet (EDS21) of the third pressure control valve (EDS2) connected to the first pressure circuit (1), an outlet (EDS22) of the third pressure control valve (EDS2) connected to a control surface (KVC) of a spring-loaded proportional valve (KV), the proportional valve (KV) configured for connecting a section (2K) of the second pressure circuit (2) to a supply of the second pressure circuit (2) depending on a pressure acting at the control surface (KVC) of the proportional valve (KV).

11. The hydraulic system (HY) of claim 1, wherein further comprising an electronic control unit (ECU) for open-loop control at least of the first pressure control valve (EDS1).

12. A motor vehicle transmission (G), comprising the hydraulic system (HY) of claim 1.

13. The motor vehicle transmission (G) of claim 12, wherein the first pressure circuit (1) of the hydraulic system (HY) is configured for actuating at least one clutch (K0, K1, K2) or at least one gear change cylinder (ST1, ST2) of the motor vehicle transmission (G), and the second pressure circuit (2) of the hydraulic system (HY) is configured for cooling the at least one clutch (K0, K1, K2).

14. The motor vehicle transmission (G) of claim 12, wherein a parking lock of the motor vehicle transmission (G) is actuatable by a hydraulically operating parking lock actuator (PSA), the parking lock actuator (PSA) controllable by a parking lock valve (PS) via an open-loop system, a supply connection (PS1) of the parking lock valve (PS) permanently connected to the first pressure circuit (1).

15. The motor vehicle transmission (G) of claim 14, wherein the hydraulic system (HY) further comprises an electromagnetically actuatable third pressure control valve (EDS2), an inlet (EDS21) of the third pressure control valve (EDS2) connected to the first pressure circuit (1), an outlet (EDS22) of the third pressure control valve (EDS2) connected to a control surface (KVC) of a spring-loaded proportional valve (KV), the proportional valve (KV) configured for connecting a section (2K) of the second pressure circuit (2) to a supply of the second pressure circuit (2) depending on a pressure acting at the control surface (KVC) of the proportional valve (KV), the outlet (EDS22) of the third pressure control valve (EDS2) also connected to a control surface (PSC) of the parking lock valve (PS).

16. A drive train for a motor vehicle, comprising the motor vehicle transmission of claim 12.

\* \* \* \* \*